No. 650,129. Patented May 22, 1900.
C. LEWIS.
DRIP COFFEE POT.
(Application filed Nov. 15, 1899.)

(No Model.)

Witnesses.
Walter F. Murray
T. C. Maphet.

Inventor.
Charles Lewis
By Geo. F. Murray
Atty

UNITED STATES PATENT OFFICE.

CHARLES LEWIS, OF CINCINNATI, OHIO, ASSIGNOR TO JAMES HEEKIN & CO., OF SAME PLACE.

DRIP-COFFEE POT.

SPECIFICATION forming part of Letters Patent No. 650,129, dated May 22, 1900.

Application filed November 15, 1899. Serial No. 737,081. (No model.)

*To all whom it may concern:*

Be it known that I, CHARLES LEWIS, a citizen of the United States, and a resident of Cincinnati, in the county of Hamilton and State of Ohio, have invented certain new and useful Improvements in Drip-Coffee Pots, of which the following is a specification.

My invention relates to improvements in drip-coffee pots. Its object is a pot in which to make French or drip coffee so that the least amount of the aroma of the coffee is lost by exposure to the air during the process of making, in which the hot water may be kept in contact with the ground coffee just the length of time desired before commencing to drip, and which is so simple of construction that it is both cheap to make and easy to clean. This object is attained by the means described in the annexed specification and illustrated in the accompanying drawings, in which—

Figure 1:
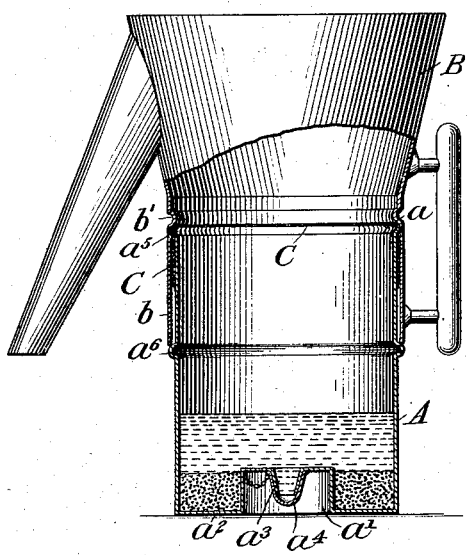
Figure 2:
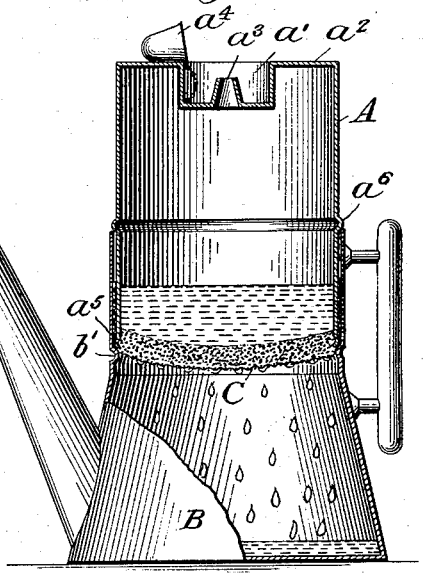
Figure 3:
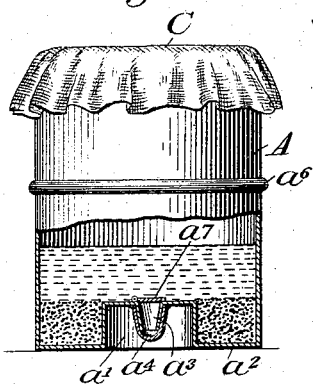
Figure 4:
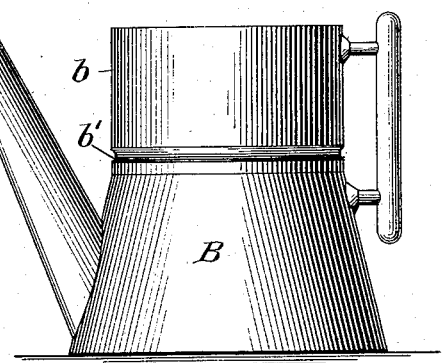

Figure 1 is a view, partly in section and partly in side elevation, of a coffee-pot embodying my invention, the pot being shown in the position it occupies just after the hot water has been poured upon the ground coffee contained in the vessel for holding it and the inverted pouring vessel has been fitted on top of it. Fig. 2 is a similar view showing the pot reinverted and the coffee dripping through the strainer into the pouring vessel. Fig. 3 is a view of a slightly modified form of the vessel for holding the ground coffee in a position similar to that in Fig. 1 after the hot water has been poured upon the coffee and the strainer placed over its top preparatory to receiving the inverted pouring vessel. Fig. 4 is a side elevation of the pouring vessel, its spout being broken off at the end to economize space.

Referring to the parts, the cylindrical vessel A for holding the ground coffee is open at one end $a$ and has a chamber $a'$ formed in its closed end $a^2$, in which is seated a nipple $a^3$, which is closed by a removable cap $a^4$, so that when the vessel is inverted, as in Figs. 1 and 3, it may rest steadily upon a flat surface. Around the open end of the vessel A is a circular flange or ring $a^5$. A second circular outwardly-projecting flange $a^6$ encircles the vessel. The pouring vessel B has a cylindrical top $b$ to fit snugly over vessel A, flange $a^5$ bearing against the interior walls of vessel B and flange $a^6$ abutting against the top of vessel B to limit the distance it slides over vessel A. Vessel B has an inwardly-projecting flange $b'$, against which flange $a^5$ abuts in this closed position of the vessels.

In use after hot water has been poured upon the ground coffee contained in the inverted vessel A, nipple $a^3$ being closed by cap $a^4$, a removable strainer C, preferably of coarse cloth, is placed over the open end of vessel A, as shown in Fig. 3, and the inverted vessel B is pushed down over it, as shown in Fig. 1. After being allowed to stand a short while the coffee-pot is inverted and the cap $a^4$ is removed from its nipple $a^3$, when the liquid coffee will, as shown in Fig. 2, drip through the cloth into the pouring vessel, the cloth being held firmly in place by reason of the close contact of the two vessels. Should it be desired to check the liquid in vessel A from dripping into vessel B, it is done by replacing cap $a^4$ upon its nipple.

In the modification shown in Fig. 3 the mouth of nipple $a^3$ is closed by a check-valve $a^7$, which opens automatically when the vessel is reinverted.

It is seen that after vessel B has been placed over vessel A communication of the interior with the air is cut off until the nipple $a^3$ is removed and may be again cut off when desired by replacing the nipple.

What I claim is—

1. In a drip-coffee pot the combination of a vessel open at one end and closed at the other for receiving ground coffee and hot water while resting upon its closed end and having a nipple closed by a removable cap near its closed end, a removable strainer to be placed over the open end of said vessel after the coffee and the water have been put into it, and a pouring vessel to fit down snugly over said vessel and strainer before the pot is reinverted, substantially as shown and described.

2. In a drip-coffee pot the combination of a vessel for holding ground coffee open at one end and closed at the other having a chamber in its closed end, a nipple closed by a removable cap seated within the chamber, a removable strainer to fit over the open end of said vessel, and a pouring vessel to fit down snugly over said vessel and strainer substantially as shown and described.

3. In a drip-coffee pot the combination of a vessel for holding ground coffee open at one and closed at the other end, a nipple in the walls of said vessel near its closed end, a check-valve to close the mouth of said nipple when it is inverted and to open automatically when it is reinverted, a removable strainer to fit over the open end of said vessel and a pouring vessel to fit down over said strainer and vessel, substantially as shown and described.

CHARLES LEWIS.

Witnesses:
GEO. J. MURRAY,
WALTER F. MURRAY.